United States Patent
Obara

(10) Patent No.: US 6,599,022 B2
(45) Date of Patent: Jul. 29, 2003

(54) BEARING APPARATUS

(75) Inventor: Rikuro Obara, Miyota (JP)

(73) Assignee: Minebea Kabushiki-Kaisha, Nagano-Ken (JP)

( * ) Notice: Subject to any disclaimer, the term of this patent is extended or adjusted under 35 U.S.C. 154(b) by 0 days.

(21) Appl. No.: 09/866,755

(22) Filed: May 30, 2001

(65) Prior Publication Data
US 2001/0053256 A1 Dec. 20, 2001

(30) Foreign Application Priority Data
Jun. 19, 2000 (JP) ........................................ 2000-183435

(51) Int. Cl.[7] ................................................ F16C 17/22
(52) U.S. Cl. ........................................ 384/493; 384/905
(58) Field of Search ................................ 384/493, 557, 384/905, 278, 504–506, 512

(56) References Cited

U.S. PATENT DOCUMENTS

| | | | | |
|---|---|---|---|---|
| 2,324,676 A | * | 7/1943 | Butterfield | 384/278 |
| 2,476,982 A | * | 7/1949 | Iles | 384/493 |
| 2,700,581 A | * | 1/1955 | Migny | 384/493 |
| 3,359,047 A | * | 12/1967 | Andersen | 384/278 |
| 4,809,833 A | * | 3/1989 | Brunken et al. | 384/905 X |
| 5,073,039 A | * | 12/1991 | Shervington | 384/278 |
| 5,112,147 A | * | 5/1992 | Imamura et al. | 384/493 |
| 6,217,221 B1 | * | 4/2001 | Abe et al. | 384/492 |
| 6,273,614 B1 | * | 8/2001 | Nicot | 384/493 |

* cited by examiner

Primary Examiner—Thomas R. Hannon
(74) Attorney, Agent, or Firm—Israel Gopstein

(57) ABSTRACT

A bearing apparatus including inner and outer rings and balls interposed therebetween, the apparatus being characterized in that it comprises:

a low expansion ring press fit around the outer periphery of the outer ring, wherein the low expansion ring is made of a material with lower factor of linear thermal expansion than the outer ring material.

6 Claims, 10 Drawing Sheets

BEARING APPARATUS

BACKGROUND OF THE INVENTION

1. Technical Field

The present invention relates to an improved bearing preferable for sustaining the rotational portion such as a spindle motor for office automation equipments like computers and peripheral devices thereof.

2. Description of the Prior Art

The bearing apparatus is used for sustaining a rotational portion such as a motor for driving a magnetic disk or disks or sustaining a pivotal swing arm portion of a hard disk drive as peripheral devices for computers. As shown in FIG. 20 the bearing usually includes a pair of single row type ball bearings. A spacer 34 is interposed between outer rings 32$b$, 33$b$ of upper and lower ball bearings 32, 33 having inner rings 32$a$, 33$a$ fit and attached to a shaft 31. The reference numerals 32$c$, 33$c$ depict balls, and 35 depicts ball retainers.

In order for the bearing apparatus to sustain a rotational load or a pivotal load with sufficient stiffness and to secure a rotational accuracy or a pivotal accuracy, the inner rings 32$a$, 33$a$ are applied predetermined pressure (hereinafter pre-load) and secured to the shaft by adhesion under ambient temperature.

However, upon an increase in the temperature of the bearing from ambient temperature under the effect of the frictional heat generated by the rotational operation or the pivotal operation of the bearing itself or the effect of heat supplied from outside the bearing, components of the bearing expand respectively into different dimensions. In case of the ball bearing 32 and 33 of the bearing apparatus, the order of an amount of the relation of expansion of the components in the radial direction is:

the outer ring>the inner ring>balls.

There is a following relationship between the radial clearance and the dimension of each components of the bearing. (radial clearance)=[inner diameter of the outer raceway−(2×diameter of each ball+outer diameter of the inner raceway)]

In this connection, upon an increase in temperature from the ambient temperature, an amount of enlargement of the inner diameter of the outer raceway will be larger than the enlargement of the outer diameter of the inner raceway formed around the inner ring, and the clearance between the two raceways will also be enlarged. Whereas an amount of the enlargement of the balls is small relative to the inner and outer raceways so that the radial clearance will be enlarged upon an increase in the temperature from the ambient temperature. The enlargement of the radial clearance will cause a range of a predetermined characteristic oscillation frequency to vary upon rotation of the bearing apparatus, and in some cases there results a resonance with other components of the equipment into which the bearing apparatus is incorporated.

When the bearing apparatus of the prior art of the above described structure is used in the rotating portion of a motor for driving a hard disk drive, sometimes accuracy of writing or reading data is hampered by an unacceptable level of vibration of the drive caused by resonance with the other component, such as a swing arm portion, a chassis or a baseplate. There is also a possibility for generating noises caused by the vibration, and reducing the quietness of the drive.

Provided that the difference of the amount of thermal expansion between the clearance of the inner and outer rings and the balls is further increased, a clearance is defined between the balls and the raceways of the inner and outer rings, and the rotational inaccuracy of a hub of the motor and the run out of the surface of the magnetic disk or disks due to the rotational run out of the hub of the motor is increased. This effect will deteriorate the reliability of the hard disk drive.

Although the balls are usually made of steel material, ceramic material may also be used for enhancing the durability thereof. In such a case, the above mentioned problem caused by the difference of the amount of thermal expansion between components will become more serious, since the amount of thermal expansion of the ceramic material is further lower (about ⅒) than that of the iron material used for the inner and outer rings.

Accordingly the object of the present invention is to provide a bearing wherein an appropriate radial clearance is maintained and thus the predetermined pre-load is applied constantly to the balls even if the components of the bearing expand by an increase in temperature from the ambient temperature thereof. The purpose of the present invention is to provide a bearing apparatus capable of sustaining high rotational accuracy or high pivotal accuracy and long life even upon increases of temperature from ambient temperature.

SUMMARY OF THE INVENTION

In order to achieve the purpose of the present invention, a bearing apparatus according to a first aspect of the present invention is formed by a plurality of balls arranged between an inner and an outer ring, and a ring made of a material with a lower factor of linear expansion than the outer ring material is press fitted around the outer ring.

A compound bearing appratus in accordance with the second aspect of the present invention comprises a shaft to which an inner ring is fit slidably, a cylindrical outer ring member surrounding the shaft, a plurality of balls of a first row interposed between a first inner raceway formed on an outer periphery of the inner ring and a first outer raceway formed on an inner periphery of the outer ring member, a plurality of balls of a second row interposed between a second inner raceway formed directly on an outer periphery of the shaft and a second outer raceway formed on the inner periphery of the outer ring member, the bearing apparatus being characterized in that it comprises:

a low expansion ring press fit around the outer periphery of the outer ring member, wherein the low expansion ring is made of a material with a lower factor of linear thermal expansion than a material of the outer ring member, and the inner ring is secured on the shaft with applying a reasonable amount of pre-load thereon.

A compound bearing apparatus in accordance with the third aspect of the present invention comprises a stepped shaft having a larger diameter shaft portion and a reduced diameter shaft portion, an inner ring fit slidably around the reduced diameter shaft portion of the stepped shaft, and a cylindrical outer ring member surrounding the shaft, a plurality of balls of a first row interposed between a first inner raceway formed on an outer periphery of the inner ring and a first outer raceway formed on an inner periphery of the outer ring member, and a plurality of balls of a second row interposed between a second inner raceway formed directly on an outer periphery of the larger diameter shaft portion of the stepped shaft and a second outer raceway formed on an inner periphery of the outer ring member, the bearing apparatus being characterized in that it comprises:

a low expansion ring press fit around the outer periphery of the outer ring member, wherein the low expansion ring is made of a material with a lower factor of linear thermal expansion than a material of the outer ring member, and the inner ring is secured on the shaft with applying a reasonable amount of pre-load thereon.

The balls are made of ceramic material and the low expansion ring is also made of ceramic material.

BRIEF DESCRIPTION OF THE DRAWINGS

Further feature of the present invention will become apparent to those skilled in the art to which the present invention relates from reading the following specification with reference to the accompanying drawings, in which.

DETAILED DESCRIPTION OF THE PRESENT INVENTION

Figure 1:
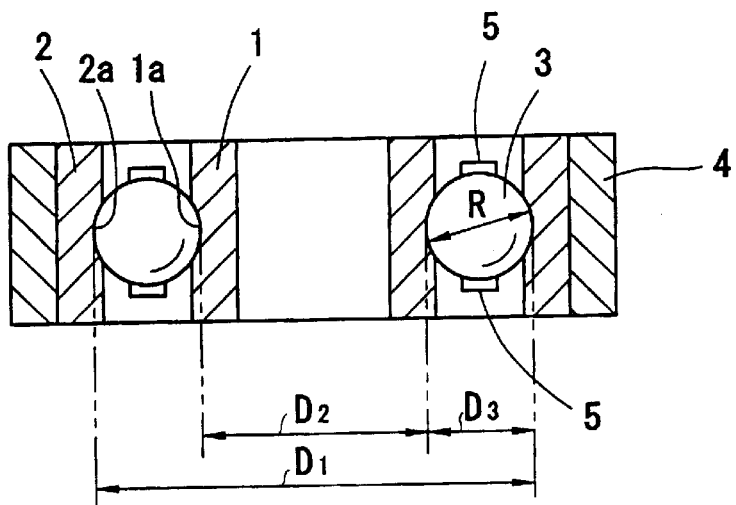
FIG. 1 is a longitudinal sectional view showing a single row type ball bearing apparatus of the first embodiment in accordance with the present invention.

Preferred embodiments of a bearing apparatus in accordance with the present invention will now be described in detail with reference to the concrete example illustrated in the attached drawings.

A bearing apparatus in accordance with the first embodiment of the present invention is of a single row type ball bearing including inner and outer rings 1 and 2, a plurality of balls 3 of ceramic material interposed between an inner raceway 1a formed as a groove on an outer peripheral surface of the inner ring 1 and an outer raceway 2a formed as a groove on an inner peripheral surface of the outer ring 2, and a low expansion ring 4 press fit around the outer periphery of the outer ring 2. The low expansion ring 4 is made of a material with lower factor of linear thermal expansion than the outer ring material.

The inner and outer rings 1 and 2 are made of iron material such as high carbon chromium bearing steel or stainless steel. The low expansion ring 4 is made of ceramic material. The factor of linear thermal expansion of the ceramic material is $1/1.5$–$1/3$ of that of the iron material. The reference numeral 5 indicates a ball retainer.

Upon rising the temperature of the bearing apparatus under the effect of the frictional heat generated by the rotation or the operation of the bearing apparatus itself or the effect of heat energy supplied from the outside of the bearing apparatus, the thermal expansion of the components of the bearing apparatus will be caused. However, the tendency of expansion of the outer race 2 is constrained by the low expansion ring 4 press fit therearound, so that the amount of the expansion of the inner diameter of the outer raceway 2a is also suppressed.

The amount of expansion of the inner diameter $D_1$ of the outer raceway 2a of the outer ring 2 can be constrained substantially equal to the amount of expansion of the outer diameter $D_2$ of the inner raceway 1a of the inner ring 1 by setting the pressure to be applied on the outer ring by means of the low expansion ring 4 to any reasonable value. Thus when the inner ring 1 is applied a predetermined pre-load and secured to the shaft by adhesion under ambient temperature, the predetermined pre-load is applied constantly to the balls even if the components of the bearing expand by an increase in temperature from the ambient value thereof.

Although the above mentioned bearing apparatus of the first embodiment is a single row type ball bearing, the present invention is also applied to a compound bearing apparatus including two parallel rows of balls. The embodiments (the second to nineteenth embodiments) of the compound bearing will now be described.

Figure 2:
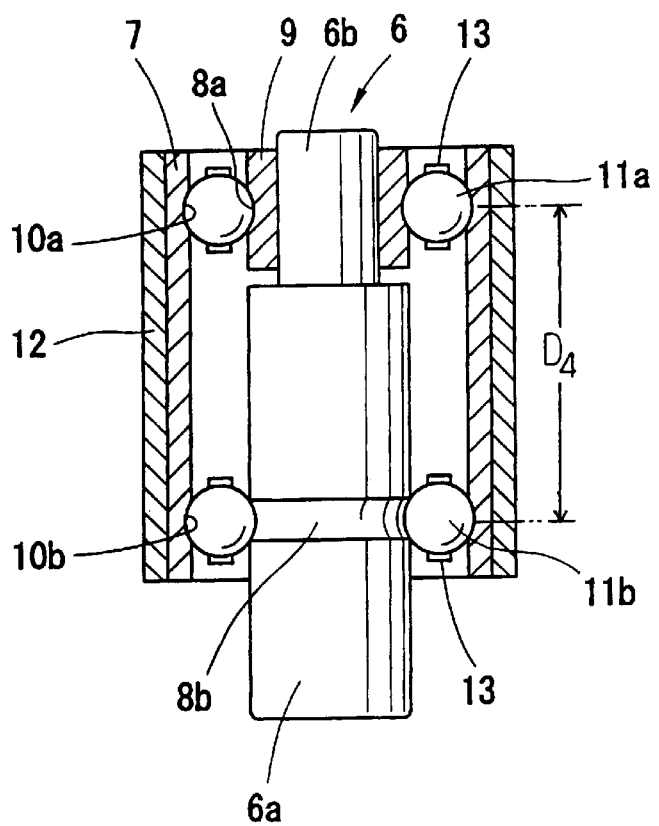
FIG. 2 is a longitudinal sectional view showing the bearing apparatus of the second embodiment in accordance with the present invention.

As shown in FIG. 2 the bearing apparatus of the second embodiment in accordance with the present invention comprises a stepped shaft 6 having a larger diameter shaft portion 6a and a reduced diameter shaft portion 6b, an inner ring 9 fit slidably around the reduced diameter shaft portion 6b of the stepped shaft, a cylindrical sleeve outer ring 7 surrounding the shaft. The first inner raceway 8a is formed as a groove on the outer periphery of the inner ring 9, and the second inner raceway 8b is formed as a groove on the outer periphery of the larger diameter shaft portion 6a.

The sleeve outer ring 7 includes upper and lower portions on the inner periphery of which is provided directly with a pair of parallel first and the second outer raceways 10a and 10b respectively and a central portion therebetween. The sleeve outer ring 7 is adapted to serve as an outer ring in common with both rows. A plurality of balls 11a for the first row are interposed between the first outer raceway 10a and the first inner raceway 8a, and a plurality of balls 11b for the second row are interposed between the second outer raceway 10b and the second inner raceway 8a.

The balls 11a and 11b are made for example of ceramic material and are equal in their diameter. This is because the outer diameter of the inner ring 9 is the same as that of the larger diameter shaft portion 6a of the stepped shaft.

A low expansion ring 12 is press fit around the outer periphery of the sleeve outer ring 7. The low expansion ring 12 is of a material of lower factor of linear thermal expansion than a material of the sleeve outer ring 7.

The low expansion ring 12 is a straight cylindrical member, and each of the inner and outer diameters of which is identical over the axial direction. The low expansion ring is adapted to intimately join on its inner peripheral surface over the entire surface of the outer periphery of the sleeve outer ring. The reference numeral 13 indicates a ball retainer.

In the bearing apparatus of the second embodiment, upon increasing the temperature of the bearing apparatus under the effect of the frictional heat generated by the rotation or the operation of the bearing apparatus itself or the effect of heat energy supplied from outside the bearing apparatus, the thermal expansion of the components of the bearing apparatus will also be caused in the same manner as the bearing apparatus of the abovementioned first embodiment. However, the expansion of the sleeve outer ring 7 in the radial direction is constrained under the effect of the low expansion ring 12 press fit therearound, i.e. the amount of expansion of the inner diameter of the outer raceways 10a, 10b of the sleeve outer ring can be constrained in substantially the same value of the amount of expansion of the outer diameter of the first and the second inner raceways 8a, 8b by setting the pressure to be applied by the low expansion ring 12 on the sleeve outer ring in a reasonable value. Thus the spacing between the inner and the outer raceways can be maintained in a substantially constant value. The sleeve outer ring tends to expand axially upon in increase in temperature. The axial expansion of the sleeve outer ring 7 will lead to the enlargement of the spacing $D_4$ between the first and the second outer raceways 10a and 10b. In other words, the outer raceways will displace to reduce the radial clearance defined between the raceways of each row and balls. Thus the radial clearance can be maintained at a reasonable value even if the temperature rises, and stable rotation of the bearing apparatus can thus be obtained.

In the compound bearing apparatus including two rows of balls such as that of the second embodiment, an appropriate pre-load is applied on the inner ring 9 for obtaining the stable rotation, when the bearing apparatus is manufactured.

In the bearing apparatus of the present invention, the radial clearance is maintained in the reasonable value in spite of the variation of the temperature, so that the pre-load can also be maintained in the reasonable value.

In the above mentioned bearing apparatus of the second embodiment, the sleeve outer ring 7 is served as an outer ring in common with both of the upper and the lower rows so that the number of parts can be reduced, the diameter of the larger diameter shaft portion 6a can be enlarged by the thickness of the outer ring of the ball bearing, and the diameter of the reduced diameter shaft portion 6b can also be enlarged by the thickness of the outer ring of the ball bearing, i.e. generally thick stepped shaft 6 can be obtained.

Accordingly, the stepped shaft 6 of higher rigidity, good at durability, inhibited in its rotational run out, and good at quietness can be obtained.

Figure 3:
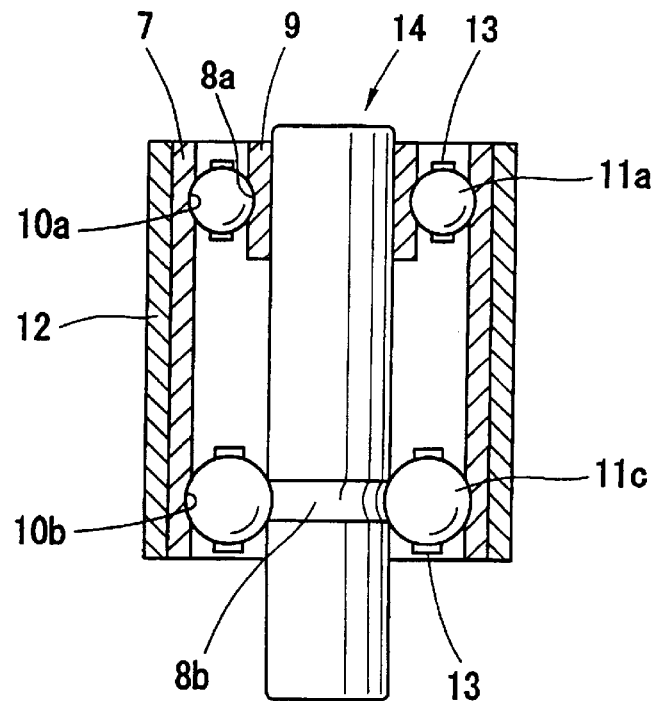
FIG. 3 is a longitudinal sectional view showing the bearing apparatus of the third embodiment in accordance with the present invention.

In the bearing apparatus of the above mentioned second embodiment, although the shaft is formed as the stepped shaft 6, the shaft can be a straight shaft 14 as that of the third embodiment as shown in FIG. 3.

The bearing apparatus of the third embodiment is also provided with the inner ring 9 on the side of the first row of balls 11a (i.e. the upper side in FIG. 3). Whereas no inner ring is provided on the side of the second row of balls 11c (i.e. the lower side in FIG. 3), and the second inner raceway 8b is formed directly on the outer peripheral surface of the straight shaft 14.

Thus the balls 11c of the second row are larger in their diameter than that of the balls 11a of the first row.

The general structure of the bearing apparatus of the third embodiment is substantially identical with that of the second embodiment but for the arrangement of the shaft and the balls of the second row.

Figure 4:
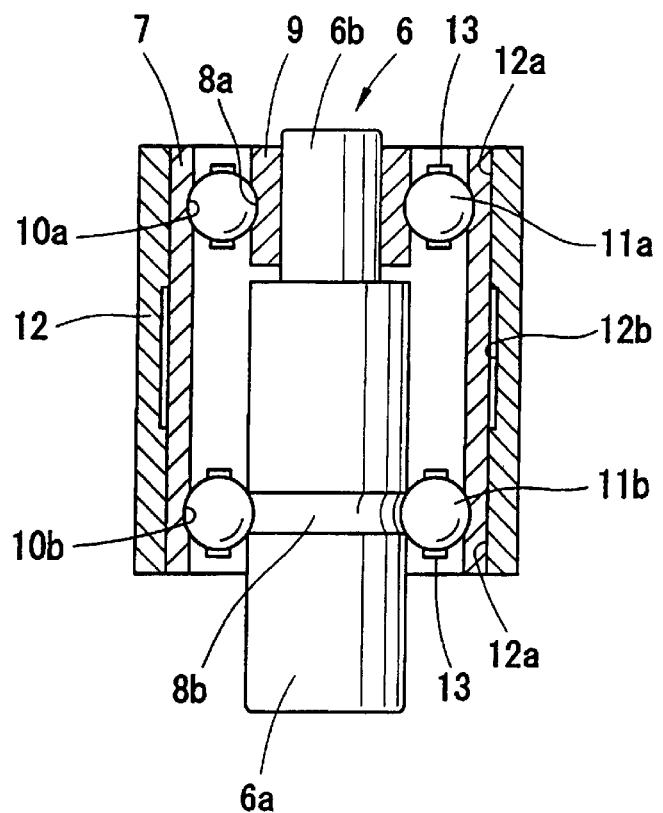
FIG. 4 is a longitudinal sectional view showing the bearing apparatus of the fourth embodiment in accordance with the present invention.
Figure 5:
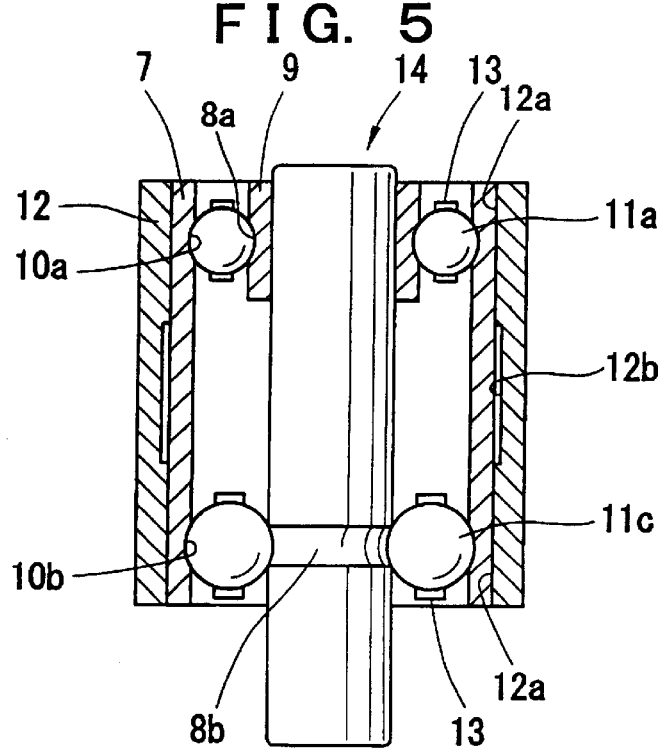
FIG. 5 is a longitudinal sectional view showing the bearing apparatus of the fifth embodiment in accordance with the present invention.

In the bearing apparatus of the second and the third embodiments, the low expansion ring 12 is a straight cylindrical member. Whereas a cylindrical member including upper and lower reduced inner diameter portions 12a, 12a and a thin walled larger inner diameter portion 12b interposed therebetween can also be used as each of the fourth and the fifth embodiments as illustrated in FIGS. 4 and 5 respectively. In such cases, the outer peripheral surfaces of the upper and the lower portions of the sleeve outer ring on the inner peripheral surface of which is provided with the first and the second outer raceways 10a, 10b are pressed inwardly by inner peripheral surface of the reduced inner diameter portion 12a, 12a.

The bearing apparatus of the fifth embodiment as shown in FIG. 5 is arranged to substitute a straight shaft 14 for the stepped shaft 6 of the fourth embodiment shown in FIG. 4, and the components or arrangements other than the shaft and the balls of the second row are identical with those of the fourth embodiment.

In the bearing apparatus of the second to the fifth embodiments, the sleeve outer ring 7 or the outer ring member is adapted to be surrounded entirely over the outer periphery thereof by means of the low expansion ring 12 of a sleeve shape. Whereas a short cylindrical low expansion ring can also be used to surround a portion of the outer ring member as those of the sixth to the nineteenth embodiment illustrated in FIGS. 6–19. Further the outer ring member and/or the low expansion ring may also be formed by a pair of upper and lower rings rather than the one ring. These embodiments will now be described concretely as follows.

Figure 6:
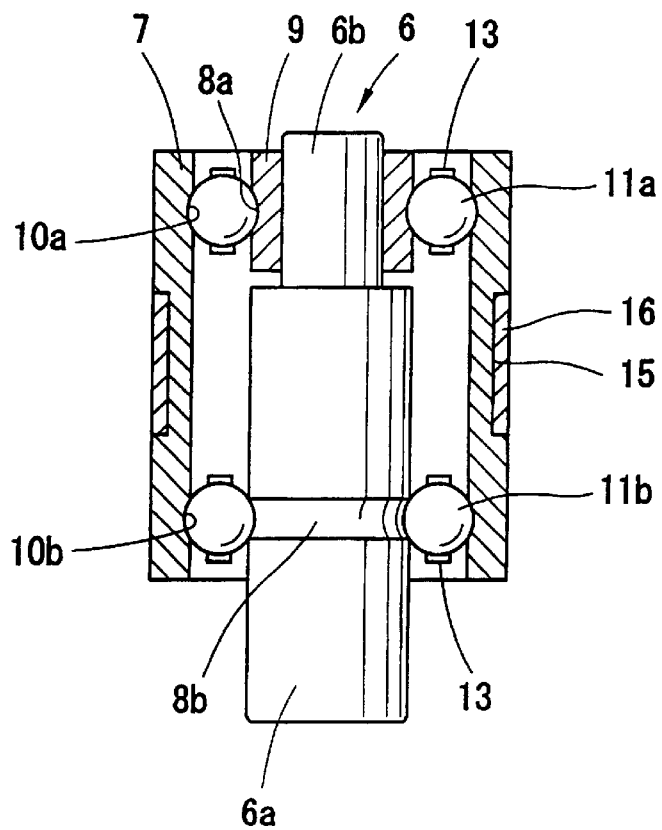
FIG. 6 is a longitudinal sectional view showing the bearing apparatus of the sixth embodiment in accordance with the present invention.
Figure 7:
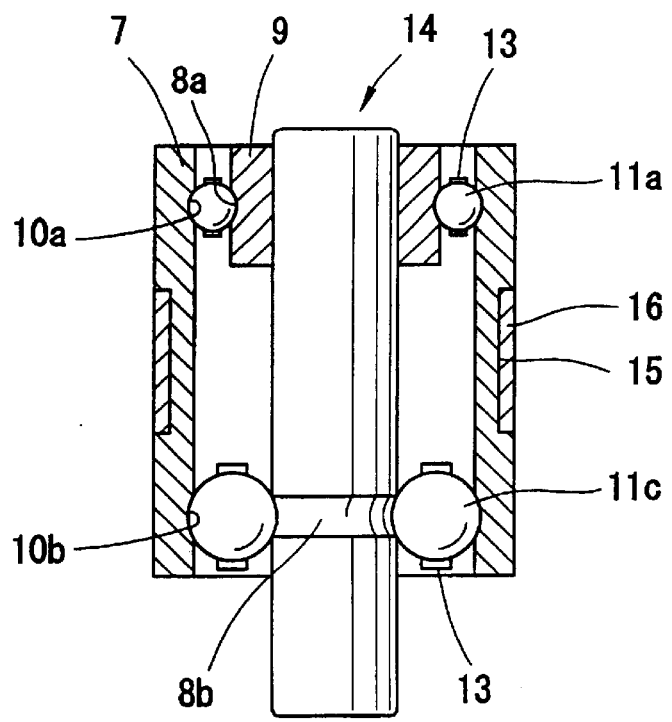
FIG. 7 is a longitudinal sectional view showing the bearing apparatus of the seventh embodiment in accordance with the present invention.

In the bearing apparatuses in accordance with the sixth and the seventh embodiments shown in FIGS. 6 and 7, the sleeve outer ring 7 includes upper and lower portions and a central portion. The upper and the lower portions are provided on their inner peripheral surface with the first and the second outer raceways 10a and 10b respectively. The central portion is provided on the outer periphery thereof a thin walled reduced outer diameter portion 15. A low expansion ring 16 is press fit around the reduced outer diameter portion 15.

The outer diameter of the low expansion ring 16 is the same as that of the upper and lower portions of the sleeve outer ring 7, so that the bearing apparatus of straight configuration and having substantially constant outer diameter can be obtained.

The bearing apparatus of the seventh embodiment as shown in FIG. 7 is arranged to substitute a straight shaft 14 for the stepped shaft 6 of the sixth embodiment shown in FIG. 6, and the components or arrangements other than the shaft and the balls of the second row are identical with those of the sixth embodiment.

Although in the above mentioned the sixth and the seventh embodiments, a pair of outer raceways 10a and 10b are formed on the inner surface of the sleeve outer ring 7, the sleeve outer ring can be formed by a pair of first and second sleeve outer rings 7a, 7b such as those of the eighth to the eleventh embodiments as shown in FIGS. 8–11.

In the eighth and the ninth embodiments, each of the first and the second sleeve outer rings 7a and 7b is formed with reduced outer diameter stepped portions 17a, 17b respectively on their ends opposed with each other. The end faces of these reduced outer diameter stepped portions are machined in high accuracy to contact intimately with each other. A low expansion ring 16 is adapted to be press fit around the outer periphery of the reduced outer diameter portions 17a, 17b.

Figure 8:
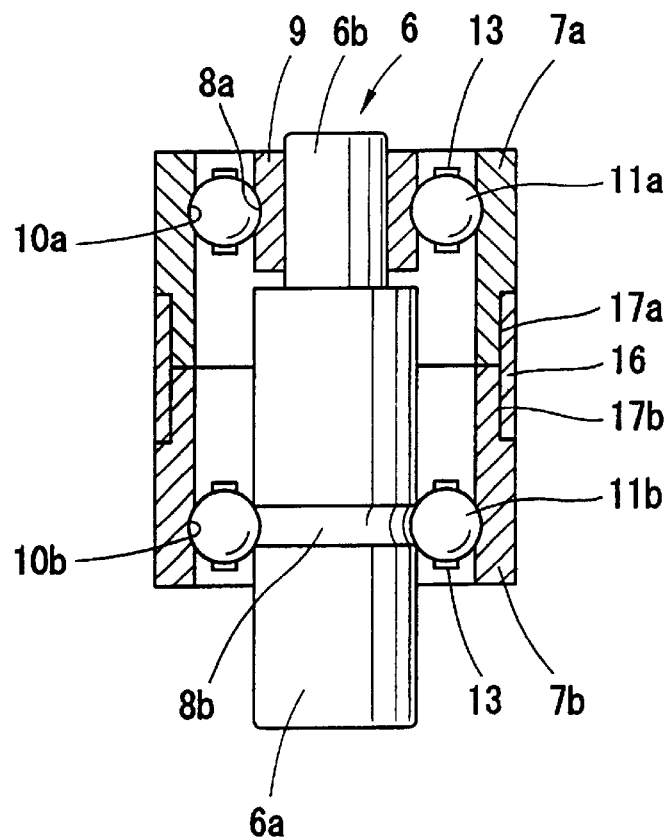
FIG. 8 is a longitudinal sectional view showing the bearing apparatus of the eighth embodiment in accordance with the present invention.
Figure 9:
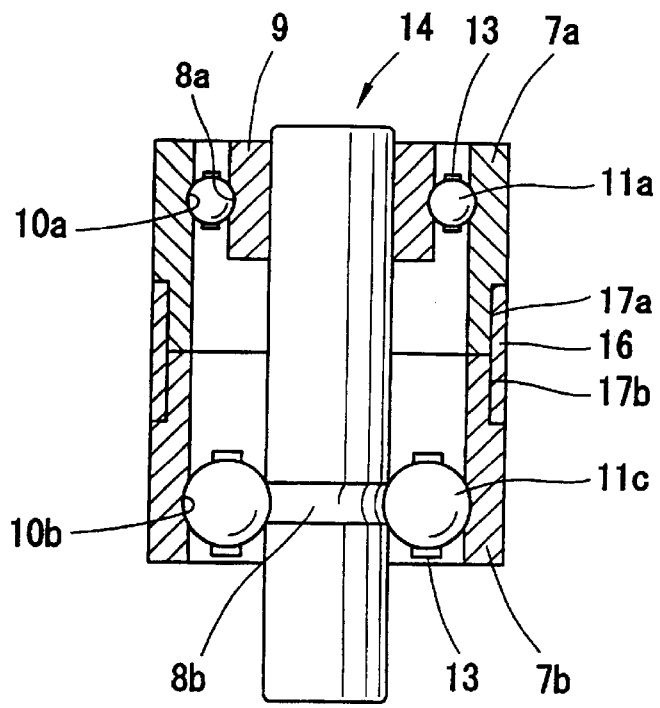
FIG. 9 is a longitudinal sectional view showing the bearing apparatus of the ninth embodiment in accordance with the present invention.

The bearing apparatus of the ninth embodiment as shown in FIG. 9 is arranged to substitute a straight shaft 14 for the stepped shaft 6 of the eighth embodiment as shown in FIG. 8, and the components or arrangements other than the shaft and the balls of the second row are identical with those of the eighth embodiment.

In the tenth and the eleventh embodiments, each of the first and the second sleeve outer rings 7a and 7b is formed with reduced outer diameter stepped portions 17a, 17b respectively on their ends opposed with each other. The end faces of these reduced outer diameter stepped portions are machined in high accuracy to contact intimately with each other. Each of the first and the second low expansion rings 16a, 16b is adapted to be press fit respectively around the outer periphery of each of the reduced outer diameter portions 17a, 17b.

Figure 10:
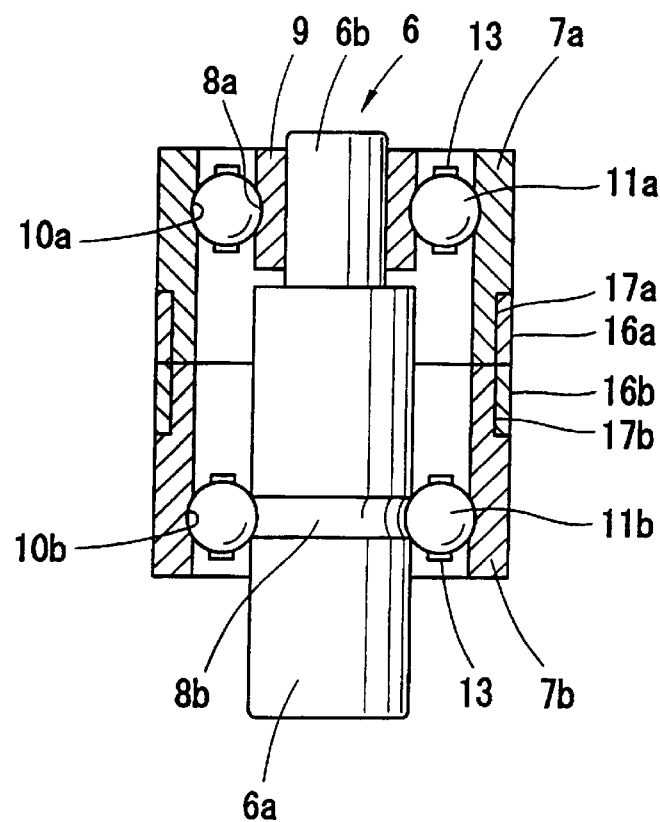
FIG. 10 is a longitudinal sectional view showing the bearing apparatus of the tenth embodiment in accordance with the present invention.
Figure 11:
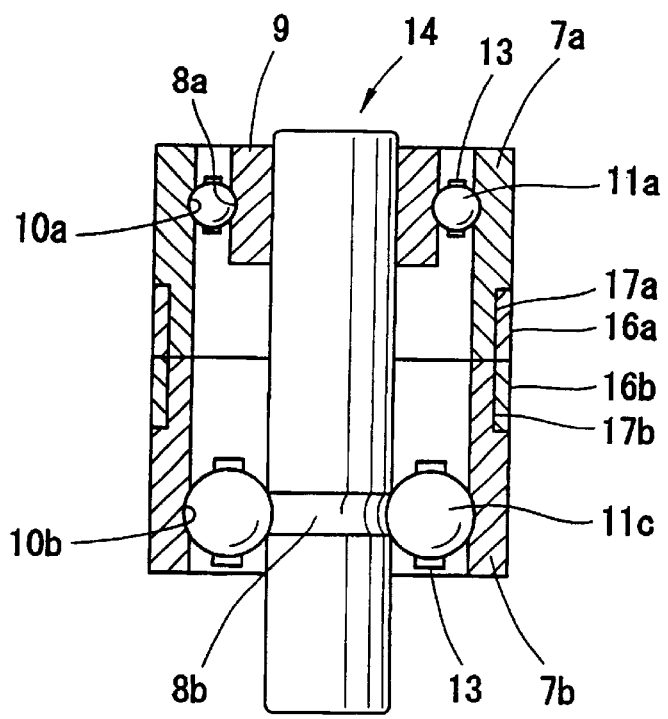
FIG. 11 is a longitudinal sectional view showing the bearing apparatus of the eleventh embodiment in accordance with the present invention.

The bearing apparatus of the eleventh embodiment as shown in FIG. 11 is arranged to substitute a straight shaft 14 for the stepped shaft 6 of the tenth embodiment as shown in FIG. 10, and the components or arrangements other than the shaft and the balls of the second row are identical with those of the tenth embodiment.

In the bearing apparatus of the eighth to the eleventh embodiments, the press fitting operation of the low expansion ring or the rings around the reduced outer diameter portions of the sleeve outer ring can be effected easier, since the sleeve outer rings of these embodiments can be divided or separated into the upper and lower outer rings.

In the bearing apparatus of the above described the second to the seventh embodiments, the sleeve outer ring 7 has a pair of outer raceways thereon. It is difficult to machine these two outer raceways with assuring the concentricity and/or the parallelism between the raceways in high precision. This machining operation is particularly difficult where the balls of the first row are spaced relatively larger from those of the second row. Whereas in the bearing apparatus of the eighth to the eleventh embodiments, the operation for machining the outer raceways in high accuracy can relatively easily be carried out. This is because the sleeve outer ring is divided into two sleeve outer rings 2a, 2b, and the machining operation might be carried out in each of these sleeve outer rings. In other words, the raceways can easily be machined in high accuracy. This will bring the great advantage that the raceways can easily be machined in high accuracy even if the spacing between the balls of the first row and those of the second row is relatively large.

Figure 12:
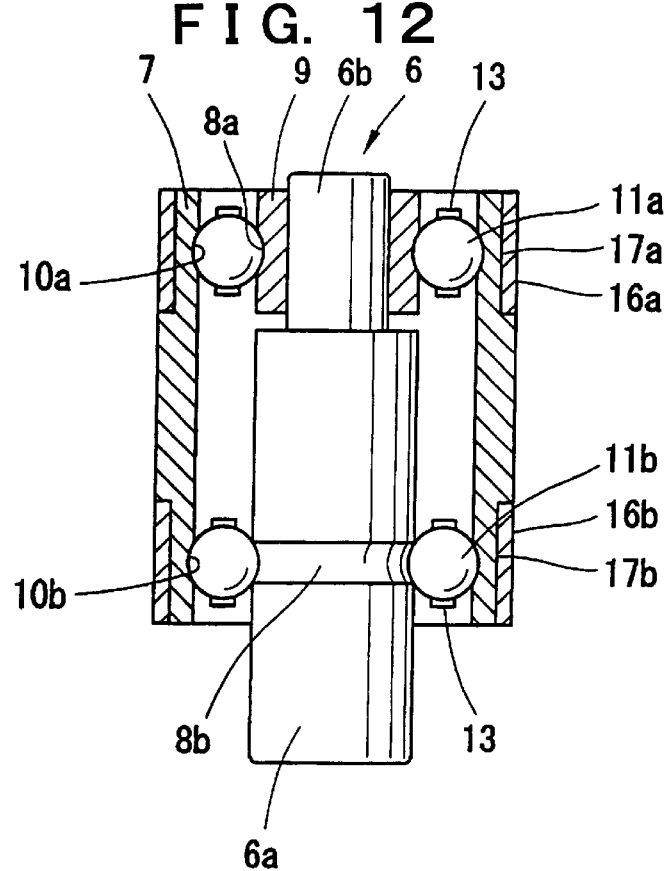
FIG. 12 is a longitudinal sectional view showing the bearing apparatus of the twelfth embodiment in accordance with the present invention.
Figure 13:
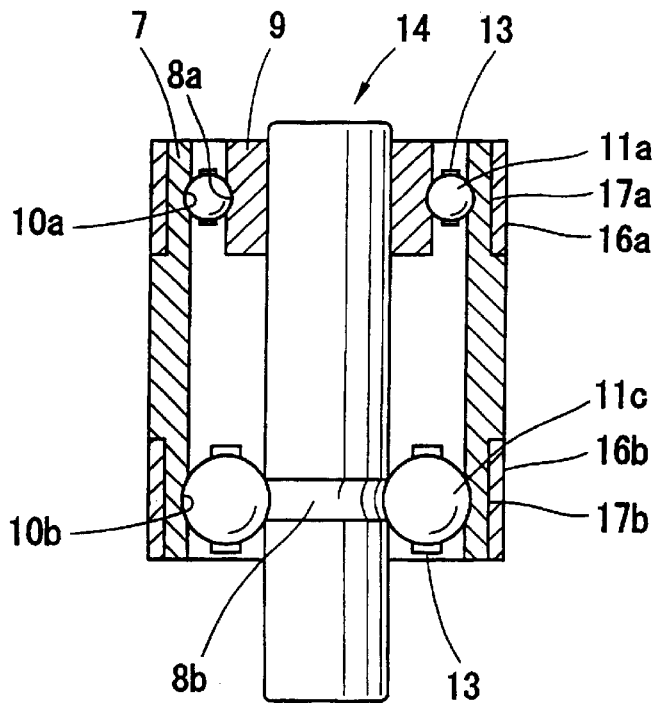
FIG. 13 is a longitudinal sectional view showing the bearing apparatus of the thirteenth embodiment in accordance with the present invention.

As in the case of the twelfth and the thirteenth embodiments shown in FIGS. 12 and 13, thin walled reduced outer diameter stepped portions 17a and 17b can be formed around the upper and lower portions of the sleeve outer ring 7. The low expansion rings 16a, 16b may be press fit therearound.

The bearing apparatus of the thirteenth embodiment as shown in FIG. 13 is arranged to substitute a straight shaft 14 for the stepped shaft 6 of the twelfth embodiment shown in FIG. 12, and the components or arrangements other than the shaft and the balls of the second row are identical with those of the twelfth embodiment.

Figure 14:
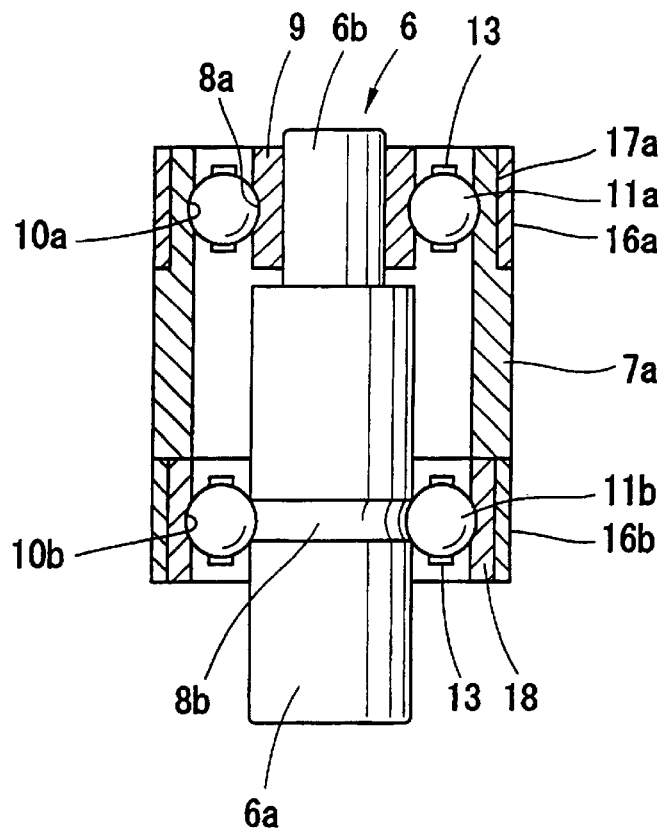
FIG. 14 is a longitudinal sectional view showing the bearing apparatus of the fourteenth embodiment in accordance with the present invention.
Figure 15:
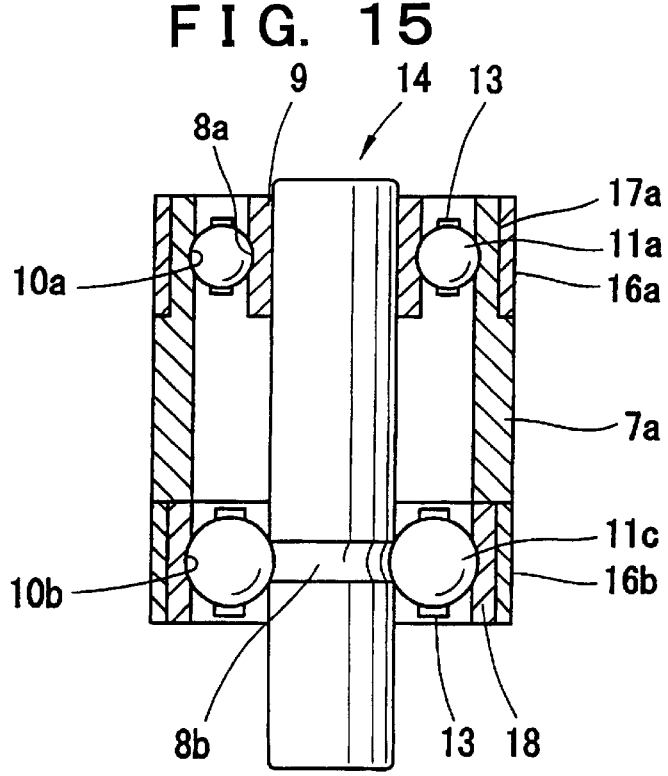
FIG. 15 is a longitudinal sectional view showing the bearing apparatus of the fifteenth embodiment in accordance with the present invention.

The bearing apparatuses of the fourteenth and the fifteenth embodiments as shown in FIGS. 14 and 15 include a sleeve outer ring 7a having the first outer raceway 10a on its inner peripheral surface on the side of the first row of balls 11a and an independent short outer ring 18 having the second outer raceway 10b on its inner peripheral surface on the side of the second row of balls 11b. The outer ring member is formed by the sleeve outer ring 7a and the independent outer ring 18.

The first outer raceway 10a is formed on the inner periphery of the upper portion of the sleeve outer ring 7a around the outer peripheral surface of which a reduced outer diameter stepped portion 17a is formed. The first low expansion ring 16a is press fit over the outer periphery of the reduced outer diameter stepped portion. The second low expansion ring 16b is press fit over the outer periphery of the independent outer ring 18.

The end faces of the sleeve outer ring 7a and the independent outer ring 18 opposed with each other are machined in high accuracy to contact intimately with each other. The outer diameter of the independent outer ring 18 is the same as that of the reduced outer diameter stepped portion 17a of the sleeve outer ring 7a. The first and the second low expansion rings 16a and 16b are equal in their inner and outer diameter. Thus the bearing apparatus having a substantially straight outer peripheral surface equal in the outer diameter in the axial direction can be obtained.

The bearing apparatus of the fifteenth embodiment as shown in FIG. 15 is arranged to substitute a straight shaft 14 for the stepped shaft 6 of the fourteenth embodiment as shown in FIG. 14, and the components or arrangements other than the shaft and the balls of the second row are identical with those of the fourteenth embodiment.

The bearing apparatuses of the sixteenth to the nineteenth embodiments as shown in FIGS. 16–19 are adapted to use a single row type ball bearing 19 in one of the ball rows. The ball bearing 19 includes inner and outer rings 20 and 21, a plurality of balls 22 of ceramic material interposed therebetween, and the first low expansion ring 16a press fit around the outer periphery of the outer ring 21.

Figure 16:
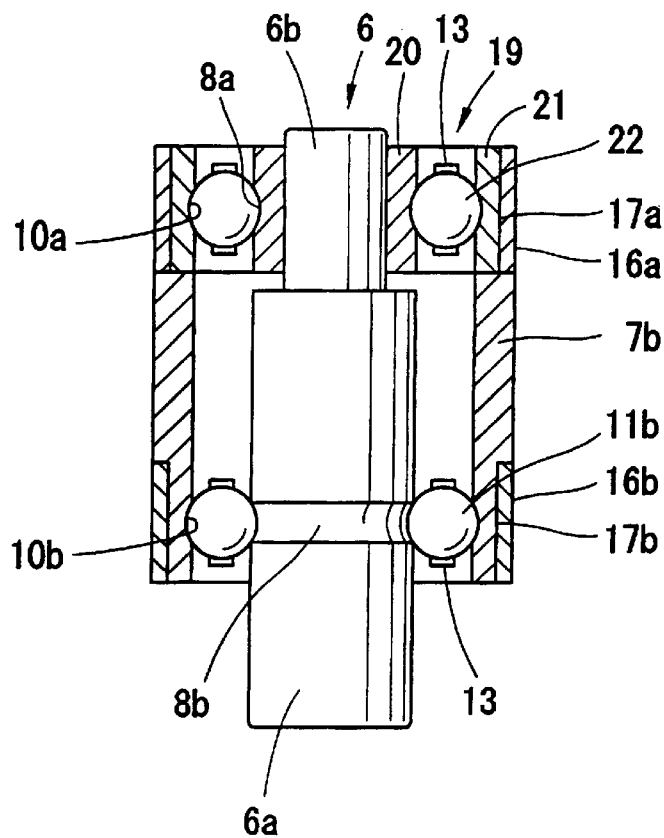
FIG. 16 is a longitudinal sectional view showing the bearing apparatus of the sixteenth embodiment in accordance with the present invention.
Figure 17:
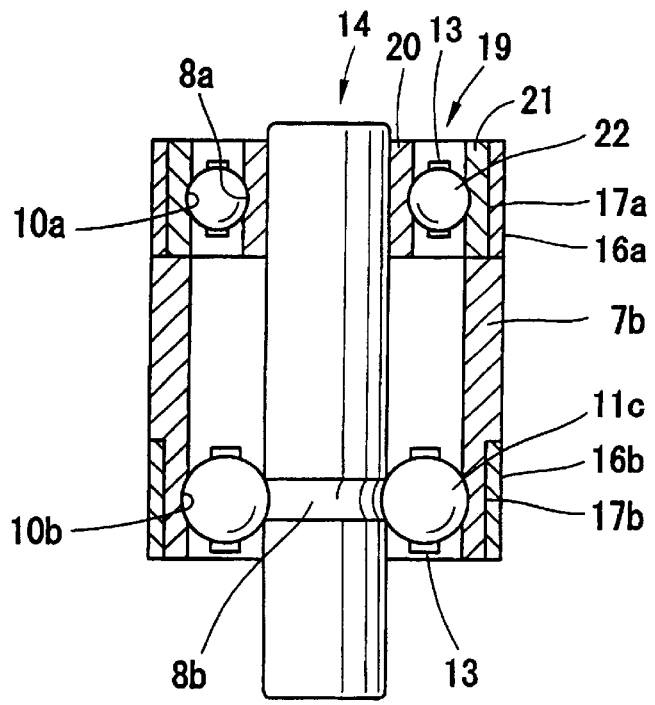
FIG. 17 is a longitudinal sectional view showing the bearing apparatus of the seventeenth embodiment in accordance with the present invention.

In the bearing apparatus of the sixteenth and the seventeenth embodiments as shown in FIGS. 16 and 17, on the side of the other row of balls 11b, the second outer raceway 10b is formed on the inner periphery of the lower portion of the sleeve outer ring 7b around the outer peripheral surface of which a reduced outer diameter stepped portion 17b is formed. The second low expansion ring 16b is press fit over the outer peripheral surface of the reduced outer diameter stepped portion 17b. The outer ring member is formed by the combination of the sleeve outer ring 7b and the outer ring 21 of the ball bearing.

The end faces of the outer ring 21 of the ball bearing and the sleeve outer ring 7b opposite with each other are machined in high accuracy to contact intimately with each other. The outer diameter of the outer ring 21 is the same as that of the reduced outer diameter stepped portion 17b of the sleeve outer ring 7b. The first and the second low expansion rings 16a and 16b are equal in their inner and outer diameter. Thus the bearing apparatus having a substantially straight outer peripheral surface equal in the outer diameter in the axial direction can be obtained.

The bearing apparatus of the seventeenth embodiment as shown in FIG. 17 is arranged to substitute a straight shaft 14 for the stepped shaft 6 of the sixteenth embodiment shown in FIG. 16, and the components or arrangements other than the shaft and the balls of the second row are identical with those of the sixteenth embodiment.

Figure 18:
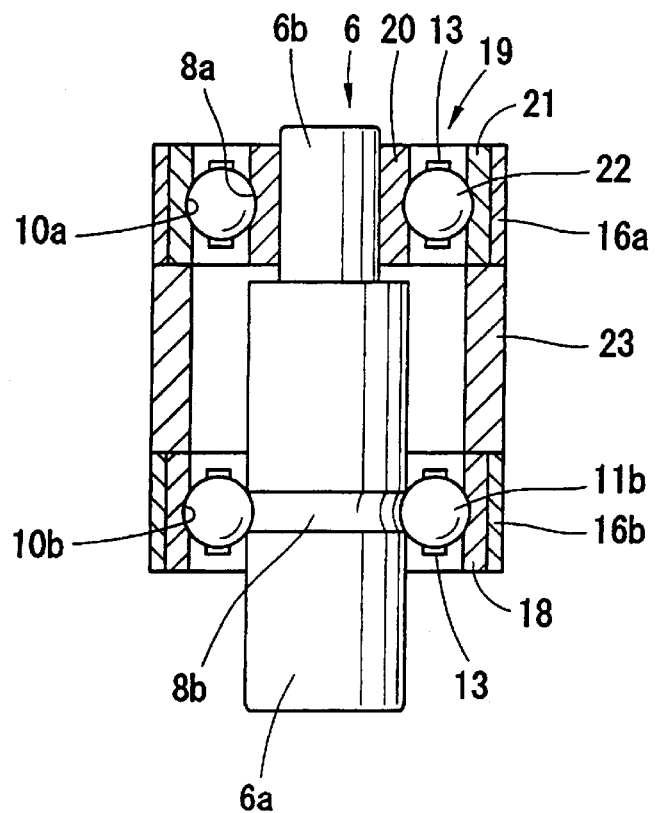
FIG. 18 is a longitudinal sectional view showing the bearing apparatus of the eighteenth embodiment in accordance with the present invention.
Figure 19:
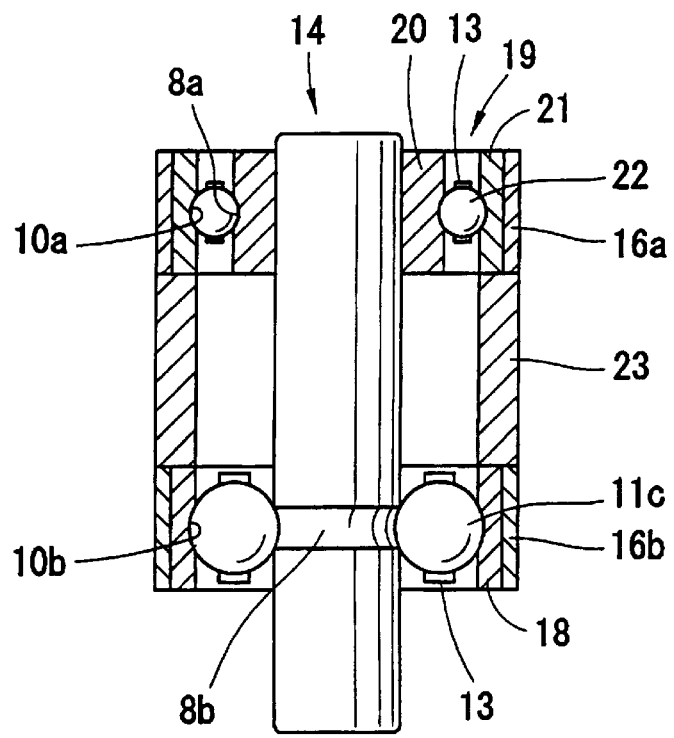
FIG. 19 is a longitudinal sectional view showing the bearing apparatus of the nineteenth embodiment in accordance with the present invention.
Figure 20:
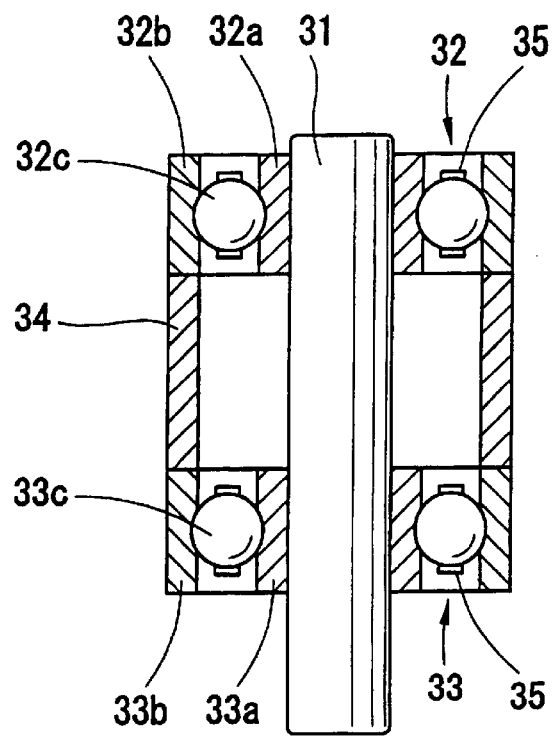
FIG. 20 is a longitudinal sectional view showing the bearing apparatus of the prior art.

The bearing apparatuses of the eighteenth and the nineteenth embodiments as shown in FIGS. 18 and 19 include an independent short outer ring 18 having the second outer raceway 10b on its inner peripheral surface on the side of the second row of balls 11b. The second low expansion ring 16b is press fit around the outer peripheral surface on the outer ring.

The outer ring member is constituted by the outer ring 21 of the ball bearing, the independent outer ring 18, and a cylindrical spacer 23 interposed between the outer rings 21 and 18. The both end faces of the spacer 23, the end face of the outer ring 21 opposite to the one of the end faces of the spacer, and the end face of the independent outer ring 18 opposite to the other of the end faces of the spacer are machined in high accuracy to contact intimately with each other.

The outer diameter of the outer ring 21 of the ball bearing is the same as that of the independent outer ring 18. The first and the second low expansion rings 16a and 16b are equal in their inner and outer diameter. The inner diameter of the spacer 23 is the same as that of the outer ring 21 of the ball bearing and that of the independent outer ring 18. The outer diameter of the spacer 23 is the same as that of the low expansion rings 16a and 16b. Thus the bearing apparatus having a substantially straight outer peripheral surface equal in the outer diameter in the axial direction can be obtained.

In the bearing apparatus of the eighteenth and the nineteenth embodiments, the material employed for manufacturing the outer ring 21 of the ball bearing and the independent outer ring 18 and that for the spacer 23 can be differentiated.

To say concretely, the outer rings 21, 18 are usually made of iron material whereas the spacer 23 is formed for example of a material of relatively larger factor of linear thermal expansion such as aluminum or synthetic resin.

In such an instance, upon rising the temperature of the bearing apparatus under the effect of the frictional heat generated by the rotation or the operation of the bearing apparatus, the spacer 23 expands in the axial direction and the spacing between the outer rings 21 and 18 or the spacing between the outer raceways 10a and 10b is enlarged, i.e. both outer raceways are shifted relative to the balls to reduce the radial clearance. Thus the pre-load to be applied to the balls will be maintained in a reasonable value.

The bearing apparatus of the nineteenth embodiment as shown in FIG. 19 is arranged to substitute a straight shaft 14 for the stepped shaft 6 of the eighteenth embodiment shown in FIG. 18, and the components or arrangements other than the shaft and the balls of the second row are identical with those of the eighteenth embodiment.

The bearing apparatuses of the second to the eleventh embodiment has a straight configuration equal in its outer diameter over the length thereof, so that the bearing apparatus can be assembled with a rotational member of a motor to which the bearing apparatus is to be incorporated such as a rotor hub without requiring a special machining process such as making any steps on the rotational member.

In the bearing apparatus of the first to the nineteenth embodiments, although the balls of ceramic material are used to enhance the durability of the bearing apparatus, balls of steel or other material may also be used.

The bearing apparatus of the arrangement or the structure as described above in accordance with the present invention will provide the following effects or advantages.

The radial expansion of the outer ring member is constrained by the low expansion ring even if thermal expansion of the components of the bearing apparatus will be caused by an increase in the temperature of the bearing apparatus, since the low expansion ring, which is made of a material of a lower factor of linear thermal expansion than that of the material used in the outer ring member, is press fit around the outer peripheral surface of the outer ring member. Thus the amount of expansion of the inner diameter of the outer raceways formed on the inner periphery of the outer ring member can also be retained at a relatively lower value. The low expansion ring is formed for example of ceramic material.

In the case of the bearing apparatus of the double row bearing, upon rising the temperature thereof, the sleeve outer ring 7 is tend to expand in the axial direction, and the spacing between the first and the second outer raceways is enlarged to displace the outer raceways relative to the balls of each rows so as to reduce the radial clearance. Thus the pre-load to be applied to the balls can be maintained in a reasonable value.

Thus the radial clearance of the bearing apparatus can be remained in an appropriate value and the accuracy of the rotation can also constantly be kept stable even if the temperature of the bearing apparatus is varied. In this connection, the generation of the rotational run out and noises accompanied therewith can be reduced.

In the bearing apparatus having the balls of ceramic material, the durability of the balls is higher than the balls of steel material so that the bearing apparatus of longer life can be obtained.

While particular embodiments of the present invention have been illustrated and described, it should be obvious to those skilled in the art that various changes and modifications can be made without departing from the spirit and scope of the invention.

What is claimed is:

1. A bearing apparatus including inner and outer rings and balls interposed therebetween, the apparatus being characterized in that it comprises:

a low expansion ring press fit around an outer periphery of the outer ring, wherein the low expansion ring is made of a material with a lower factor of linear thermal expansion than the outer ring material.

2. A compound bearing apparatus including:

a shaft to which an inner ring is fit slidably, a cylindrical outer ring member surrounding the shaft, a plurality of balls of a first row interposed between a first inner raceway formed on an outer periphery of the inner ring and a first outer raceway formed on an inner periphery of the outer ring member, a plurality of balls of a second row interposed between a second inner raceway formed directly on an outer periphery of the shaft and a second outer raceway formed on the inner periphery of the outer ring member, the bearing apparatus being characterized in that it comprises:

a low expansion ring press fit around an outer periphery of the outer ring member, wherein the low expansion ring is made of a material with a lower factor of linear thermal expansion than a material of the outer ring member, and the inner ring is secured on the shaft with applying a reasonable amount of pre-load thereon.

3. A compound bearing apparatus including:

a stepped shaft having a larger diameter shaft portion and a reduced diameter shaft portion, an inner ring fit slidably around the reduced diameter shaft portion of the stepped shaft, and a cylindrical outer ring member surrounding the shaft, a plurality of balls of a first row interposed between a first inner raceway formed on an outer periphery of the inner ring and a first outer raceway formed on an inner periphery of the outer ring member, and a plurality of balls of a second row interposed between a second inner raceway formed directly on an outer periphery of the larger diameter shaft portion of the stepped shaft and a second outer raceway formed on the inner periphery of the outer ring member, the bearing apparatus being characterized in that it comprises:

a low expansion ring press fit around an outer periphery of the outer ring member, wherein the low expansion ring is made of a material with a lower factor of linear thermal expansion than a material of the outer ring member, and the inner ring is secured on the shaft with applying a reasonable amount of pre-load thereon.

4. The bearing apparatus according to claim 3, characterized in that the outer diameter of the inner ring is identical with that of the larger diameter shaft portion of the stepped shaft, and the balls of the first row are identical in their diameter with that of the balls of the second row.

5. The bearing apparatus according to claim 3, characterized in that the balls are of ceramic material.

6. The bearing apparatus according to claim 3, characterized in that the low expansion ring is of ceramic material.

* * * * *